United States Patent
Podack

(10) Patent No.: US 7,508,637 B2
(45) Date of Patent: Mar. 24, 2009

(54) ANTILOCK SYSTEM FOR A PERMANENTLY EXCITED ELECTRIC MOTOR DRIVE

(75) Inventor: Marcus Podack, Würzburg (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 72 days.

(21) Appl. No.: 11/573,826

(22) PCT Filed: Aug. 4, 2005

(86) PCT No.: PCT/EP2005/053844

§ 371 (c)(1),
(2), (4) Date: Feb. 16, 2007

(87) PCT Pub. No.: WO2006/018393

PCT Pub. Date: Feb. 23, 2006

(65) Prior Publication Data

US 2007/0262740 A1   Nov. 15, 2007

(30) Foreign Application Priority Data

Aug. 18, 2004   (DE) .................. 10 2004 040 074

(51) Int. Cl.
*H02H 5/10* (2006.01)
(52) U.S. Cl. .................. 361/31; 318/767; 318/798; 318/568.24; 701/43; 180/446; 180/404; 180/443
(58) Field of Classification Search .................. 316/31; 318/767, 798, 568.24; 388/903; 701/43; 180/446, 404, 443
See application file for complete search history.

(56) References Cited

U.S. PATENT DOCUMENTS

| | | | |
|---|---|---|---|
| 6,147,396 A | 11/2000 | Troger et al. | 257/666 |
| 6,194,849 B1 | 2/2001 | Wilson-Jones et al. | 318/15 |
| 6,330,140 B1 | 12/2001 | Wilson-Jones et al. | 361/87 |
| 6,759,823 B2 | 7/2004 | Witzig | 318/434 |
| 7,019,479 B2 | 3/2006 | Tobias et al. | 318/439 |

FOREIGN PATENT DOCUMENTS

| | | |
|---|---|---|
| DE | 19749133 A1 | 5/1999 |
| DE | 10100159 A1 | 10/2001 |
| DE | 10223139 A1 | 12/2003 |
| EP | 1073174 A2 | 1/2001 |

*Primary Examiner*—Rita Leykin
(74) *Attorney, Agent, or Firm*—Baker Botts L.L.P.

(57) ABSTRACT

As an antilock system for a permanently excited electric motor drive, especially for a steering booster servo drive of a motor vehicle, in the event of a winding short-circuit, an interruption of at least one winding phase (MP1 or MP2 or MP3) of the winding affected by the short circuit is provided, by a separating means (T) triggered by an explosion directly or indirectly by the winding short-circuit. The antilock system advantageously has a separate neutral point connection part (MP) which is especially embodied as a sheet metal moulded part, is to be connected to the winding ends of the electric motor, and contains the winding phases (MP1; MP2; MP3) and the neutral point connection thereof as a single component. The antilock system is purposefully arranged on a front winding head of the electric motor and connected to the winding thereof.

18 Claims, 3 Drawing Sheets

ANTILOCK SYSTEM FOR A PERMANENTLY EXCITED ELECTRIC MOTOR DRIVE

CROSS-REFERENCE TO RELATED APPLICATIONS

This application is a U.S. national stage application of International Application No. PCT/EP2005/053844 filed Aug. 4, 2005, which designates the United States of America, and claims priority to German application number DE 10 2004 040 074.1 filed Aug. 18, 2004, the contents of which are hereby incorporated by reference in their entirety.

TECHNICAL FIELD

The invention relates to an antilock system for a permanently excited electric motor drive, in particular for a steering booster servo drive in a motor vehicle, in the event of a winding short circuit.

BACKGROUND

If, in permanently excited electric motors, a circuit state of the winding, such as a short circuit, occurs due to mechanical or electrical faults, for example, then the electric motor is locked and hence, in the case of a steering booster servo drive, so is the steering of the motor vehicle. For safety reasons, however, it is required that a vehicle can be steered at any time irrespective of the event of a short circuit.

SUMMARY

The object of the present invention is therefore to create a drive assisted by a permanently excited electric motor, in particular a steering booster servo drive, which can still be operated without locking even in the event of a short circuit and which still allows the vehicle to be steered when there is a steering booster servo drive.

This object is achieved according to an embodiment by an antilock system for a permanently excited electric motor drive in the event of a winding short circuit, comprising a separating means for providing an interruption of at least one phase winding of the winding affected by the short circuit, wherein the separating means is activated directly or indirectly by an explosion as a result of the winding short-circuit.

BRIEF DESCRIPTION OF THE DRAWINGS

The invention and further advantageous embodiments of the invention according to the subclaims are described hereafter in exemplary embodiments set out in diagram form in the drawings, wherein:

Parts that have the same function and the same name are referred to by the same reference signs in the figures.

DETAILED DESCRIPTION

According to a further enhancement, the antilock system may comprise a multiphase neutral point winding in particular at the stator end, wherein an interruption of at least one phase winding occurs in the vicinity of the neutral point, which point is preferably freely accessible for testing purposes. According to a further enhancement, an interruption of only one phase winding may occur. According to a further enhancement, the respective phase winding which is to be interrupted and likewise the separating means that can be activated by an explosion can be fixed by means of a separate mounting. According to a further enhancement, the respective phase winding which is to be interrupted and likewise the separating means that can be activated by an explosion can be arranged on a base plate. According to a further enhancement, the system may comprise a separate neutral point connection part configured in particular as a sheet metal molded part, which is to be connected to the winding ends of the electric motor, and comprises both the phase windings and the neutral point connection thereof, configured as a single component. According to a further enhancement, a short circuit can be detected by at least one sensor as part of a motor control. According to a further enhancement, a magnetoresistive resistor can be used as a sensor to detect a short circuit. According to a further enhancement, the system can be arranged on the front face of the winding head of the stator of an electric motor and connected to the winding ends of its stator winding. A permanently excited electric motor drive for a steering booster servo drive may have such an antilock system.

The antilock system according to the invention allows a rapid, irreversible interruption of the winding, by simple means and with minimal, purposefully selectable mounting space, without any loss of electric power, in such a way that locking of the drive, in particular locking of the steering when there is an electric motor-powered steering booster servo drive, can be safely avoided from the onset. Depending on the respective design of the electric motor or degree of safety required, in the case of a multiphase winding, an interruption of only one or an interruption of all the phases can be arranged or in the case of an individual-tooth winding, an interruption of only one individual-tooth winding or of all the tooth winding coils can be provided.

Figure 1:
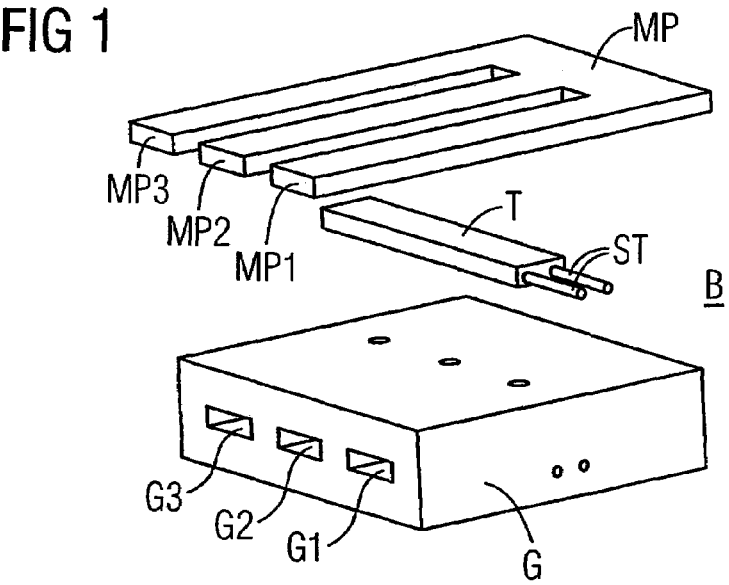
FIG. 1 shows, in a perspective exploded view, an antilock system having a neutral point connector that is embeddable in a base plate, said connector having three phase windings and assignable separating means.
Figure 2:
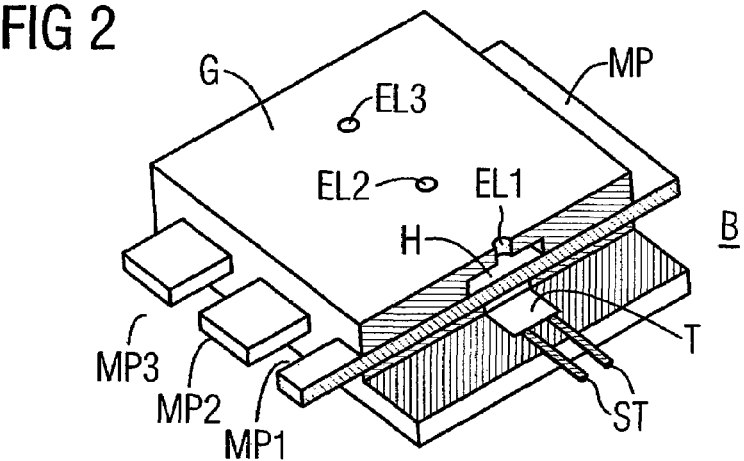
FIG. 2 shows, in a partial cross-section, the antilock system according to FIG. 1 in a reciprocally mounted state of the individual components.
Figure 3:
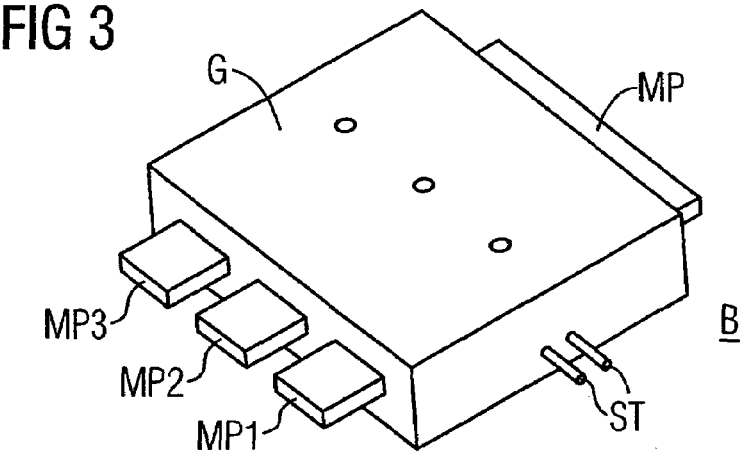
FIG. 3 shows the closed overall view of the antilock system as per FIG. 1 or FIG. 2.
Figure 4:
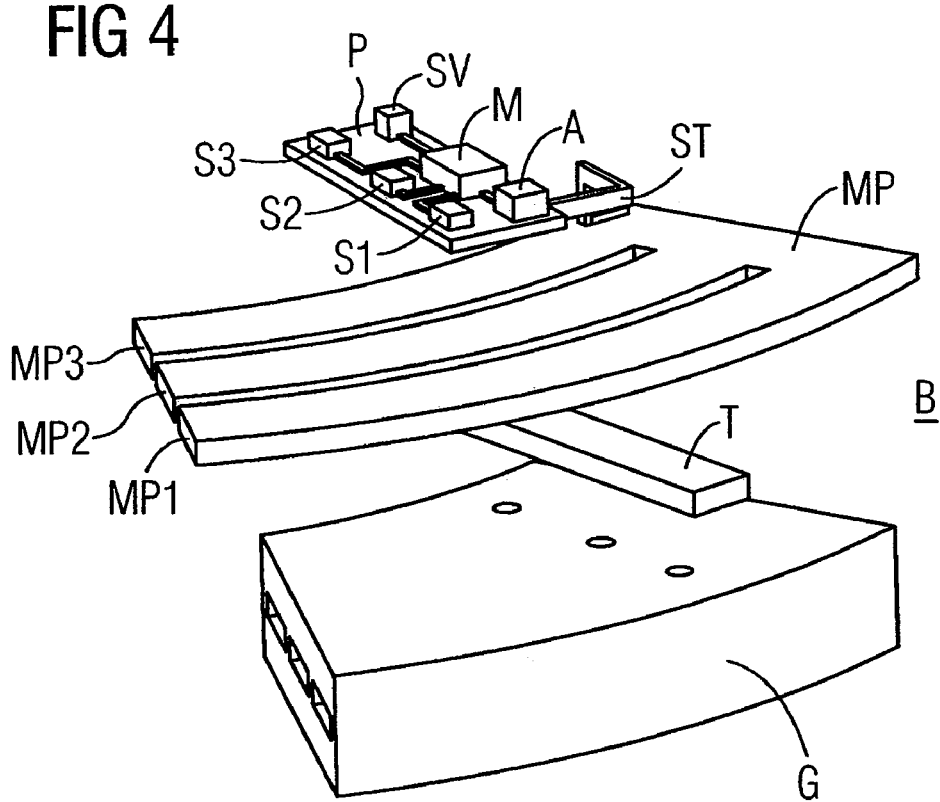
FIG. 4 shows, in a perspective exploded view, an antilock system according to FIG. 1 having motor- and separating means-control and likewise short circuit sensors assigned thereto.
Figure 5:
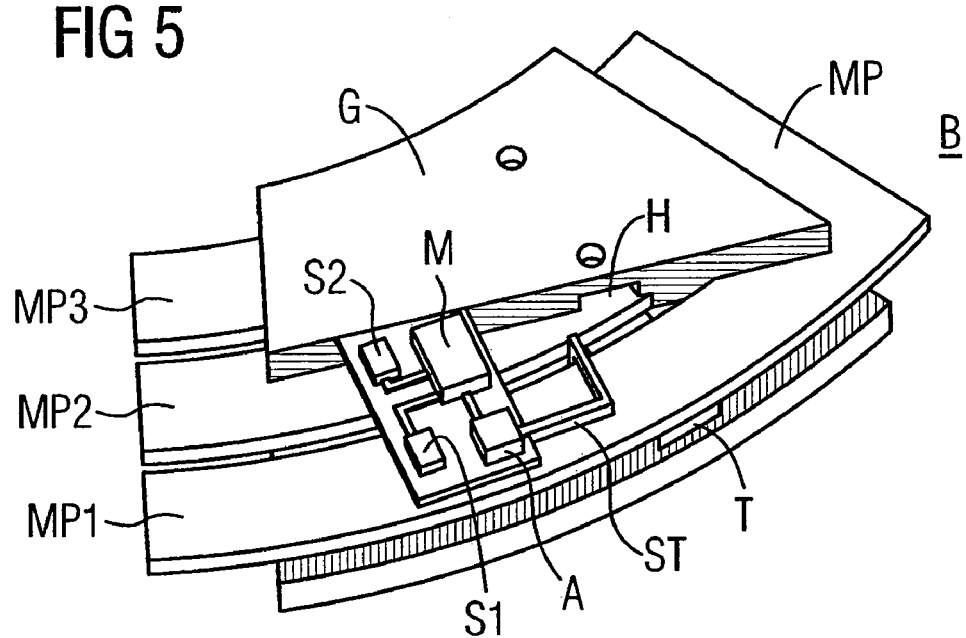
FIG. 5 shows, in a partial cross-section, the antilock system according to FIG. 4 in a reciprocally mounted state of the individual components.
Figure 6:
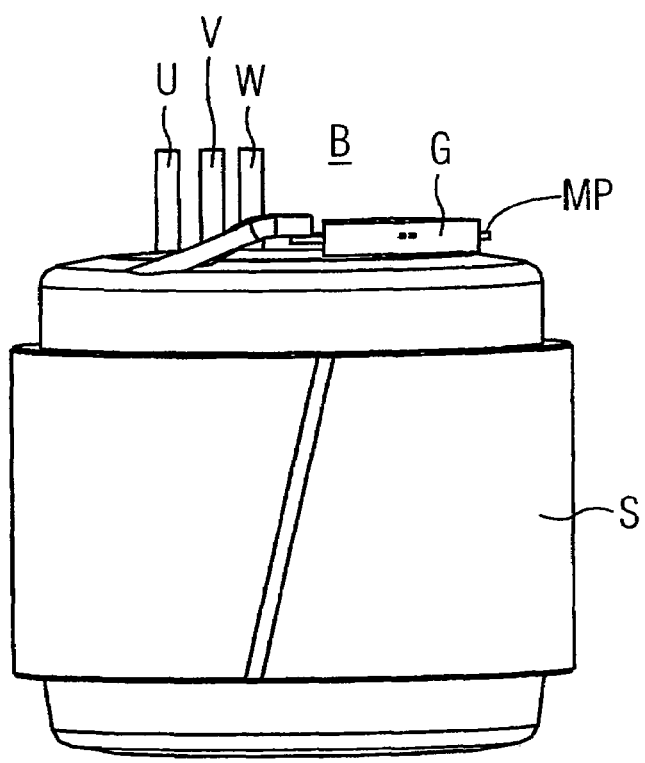
FIG. 6 shows, in an axial overall view, a stator of a permanently excited steering booster motor provided with a three-phase winding.
Figure 7:
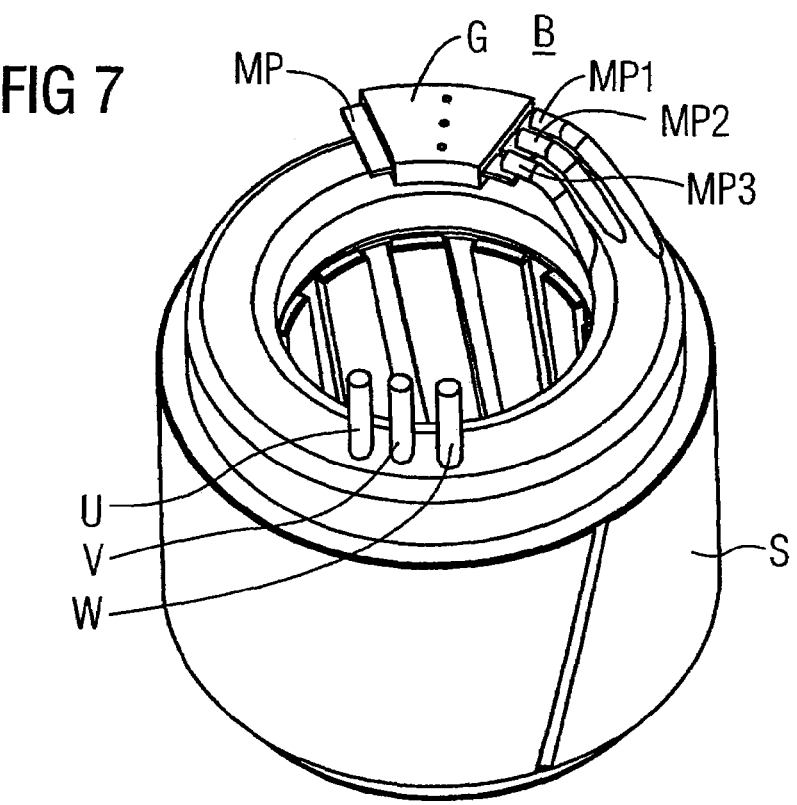
FIG. 7 shows the stator according to FIG. 6 in a perspective diagonal view.

FIG. 1 to FIG. 5 show various views and embodiments of an antilock system B, which is arranged according to FIGS. 6 and 7, and easily accessible and likewise simple to install and connect to the front winding head of a stator S of a permanently excited electric motor, in particular for a steering booster servo drive in a motor vehicle; the three-phase stator winding, having at the input end the connectors U; V; W, has at the output end three winding ends brought out in the vicinity of the antilock system B, said winding ends being connected to phase windings MP1, MP2 and MP3 of a neutral point connector MP, said connector advantageously forming a molded part configured as a single component with the phase windings MP1, MP2 and MP3, and mounted such that it can be accommodated by a housing plate G and is in particular embeddable therein; insertion channels G1, G2, G3 corresponding to the shape of the phase windings serve in particular for mounting or embedding. Mounting or embedding is purposefully achieved such that the actual neutral point remains outside the base plate G, easily accessible for testing purposes, for example.

Alongside the phase windings MP1, MP2, MP3, the base plate G accommodates the explosion-triggering separating means T that is assigned to said phase windings in such a way that, when a winding short circuit thereof is detected via a control circuit ST, electrical ignition of the respective phase winding MP1, MP2 or MP3 is pyrotechnically interruptible and hence the short circuit can be eliminated with the greatest speed.

In the exemplary embodiments shown, the separating means T runs transversely just below the phase windings MP1, MP2 and MP3 such that, in the event of ignition of the separating means, all the phase windings are interrupted; according to one embodiment, targeted interruption of only one phase winding can also be provided—for example, by using a design and arrangement of the separating means T that have been shortened accordingly.

For targeted interruption, a cavity H is provided in the base plate G, always being located in the vicinity of the separating means T, said cavity having a vent EL1; EL2; EL3, into which cavity the separate ends of the phase windings can emerge in a deforming manner.

As can be seen in particular from FIGS. 4, 5, a control M, in particular a microcontroller, is arranged on a plate P to provide ignition of the separating means T. In order to detect a short circuit, sensors S1, S2, S3, in particular in the form of magnetoresistive resistors are assigned to the phase windings MP1, MP2 and MP3, which form can be used at the same time for a motor control if so required. The sensors S1, S2, S3 are advantageously accommodated by the plate P, as is likewise a power supply SV and the control circuit ST to provide ignition of the separating means T as a function of an actuating unit A connected to the control M.

According to one embodiment as per FIGS. 6; 7, the whole of the antilock system B having the components described above advantageously accommodated by a base plate G is arranged on the front winding head of the stator of an electric motor and electrically connected to its winding ends of the stator winding which come together in a neutral point.

Basically, the invention can be summarized as follows: as an antilock system for a permanently excited electric motor drive, especially for a steering booster servo drive in a motor vehicle, in the event of a winding short-circuit, an interruption of at least one phase winding MP1 or MP2 or MP3 of the winding affected by the short circuit is provided by means of a separating means T activated by an explosion directly or indirectly as a result of the winding short-circuit. Said antilock system advantageously comprises a separate neutral point connection part MP configured in particular as a sheet metal molded part, which is to be connected to the winding ends of the electric motor, and comprises both the phase windings MP1; MP2; MP3 and the neutral point connection thereof configured as a single component. The antilock system is purposefully arranged on a front winding head of the electric motor and connected thereto.

What is claimed is:

1. An antilock system for a permanently excited electric motor drive in the event of a winding short circuit, comprising a separating means for providing an interruption of at least one phase winding of the winding affected by the short circuit, wherein the separating means is activated directly or indirectly by an explosion as a result of the winding short-circuit, further comprising a multiphase neutral point at the stator end, wherein an interruption of at least one phase winding occurs in the vicinity of the neutral point, which point is freely accessible for testing purposes.

2. An antilock system for a permanently excited electric motor drive in the event of a winding short circuit, comprising a separating means for providing an interruption of at least one phase winding of the winding affected by the short circuit, wherein the separating means is activated directly or indirectly by an explosion as a result of the winding short-circuit, wherein an interruption of only one phase winding occurs.

3. The antilock system according to claim 1, wherein the respective phase winding which is to be interrupted and likewise the separating means that can be activated by an explosion are fixed by means of a separate mounting.

4. An antilock system for a permanently excited electric motor drive in the event of a winding short circuit, comprising a separating means for providing an interruption of at least one phase winding of the winding affected by the short circuit, wherein the separating means is activated directly or indirectly by an explosion as a result of the winding short-circuit, wherein the respective phase winding which is to be interrupted and likewise the separating means that can be activated by an explosion are fixed by means of a separate mounting, and wherein the respective phase winding which is to be interrupted and likewise the separating means that can be activated by an explosion are arranged on a base plate.

5. An antilock system for a permanently excited electric motor drive in the event of a winding short circuit, comprising a separating means for providing an interruption of at least one phase winding of the winding affected by the short circuit, wherein the separating means is activated directly or indirectly by an explosion as a result of the winding short-circuit, wherein the respective phase winding which is to be interrupted and likewise the separating means that can be activated by an explosion are fixed by means of a separate mounting, and wherein the system comprises a separate neutral point connection part configured as a sheet metal molded part, which is to be connected to the winding ends of the electric motor, and comprises both the phase windings and the neutral point connection thereof, configured as a single component.

6. The antilock system according to claim 1, wherein a short circuit is detected by at least one sensor as part of a motor control.

7. The antilock system according to claim 6, wherein a magnetoresistive resistor is used as a sensor to detect a short circuit.

8. The antilock system according to claim 1, wherein the system is arranged on the front face of the winding head of the stator of an electric motor and connected to the winding ends of its stator winding.

9. A permanently excited electric motor drive for a steering booster servo drive having an antilock system according to claim 1.

10. The antilock system according to claim 1, wherein the electric motor drive is a steering booster servo drive in a motor vehicle.

11. The antilock system according to claim 1, wherein a short circuit is detected by at least one sensor as part of a motor control available per se for a permanently excited electric motor drive.

12. A method of operating a permanently excited electric motor drive, comprising in the event of a winding short circuit the steps of: providing an interruption of at least one phase winding of a winding affected by the short circuit, wherein the separating means is activated directly or indirectly by an explosion as a result of the winding short-circuit, wherein the motor drive comprises a multiphase neutral point at the stator end, the method further comprising the step of interrupting at least one phase winding in the vicinity of the neutral point, which point is freely accessible for testing purposes.

13. The method according to claim 12, wherein an interruption of only one phase winding occurs.

14. The method according to claim 12, further comprising the step of detecting a short circuit by at least one sensor as part of a motor control.

15. The method according to claim 12, further comprising the step of using a magnetoresistive resistor as a sensor to detect a short circuit.

16. An antilock system for a permanently excited electric motor drive in the event of a winding short circuit, comprising a separate neutral point connection part configured as a sheet metal molded part, which is to be connected to winding ends of the electric motor configured as a single component, and a separating means for providing an interruption of at least one phase winding of the winding affected by the short circuit arranged near said neutral connection part, wherein the separating means is activated directly or indirectly by an explosion as a result of the winding short-circuit.

17. The antilock system according to claim 16, wherein an interruption of only one phase winding occurs.

18. The antilock system according to claim 16, wherein the respective phase winding which is to be interrupted and likewise the separating means that can be activated by an explosion are fixed by means of a separate mounting.

\* \* \* \* \*